(12) United States Patent
Huang et al.

(10) Patent No.: US 8,582,812 B2
(45) Date of Patent: Nov. 12, 2013

(54) MOTION DETECTION METHOD FOR COMPLEX SCENES

(75) Inventors: Shih-Chia Huang, Taipei (TW);
Ben-Hsiang Do, Taipei (TW)

(73) Assignee: National Taipei University of Technology, Taipei (TW)

( * ) Notice: Subject to any disclaimer, the term of this patent is extended or adjusted under 35 U.S.C. 154(b) by 244 days.

(21) Appl. No.: 13/290,031

(22) Filed: Nov. 4, 2011

(65) Prior Publication Data
US 2013/0039534 A1 Feb. 14, 2013

(30) Foreign Application Priority Data
Aug. 10, 2011 (TW) .............................. 100128474 A (51) Int. Cl.
*G06K 9/00* (2006.01)
(52) U.S. Cl.
USPC ...................................... 382/103; 375/240.16
(58) Field of Classification Search
USPC ...................................... 382/103; 375/240.16
See application file for complete search history.

(56) References Cited

U.S. PATENT DOCUMENTS

| 8,238,605 | B2 * | 8/2012 | Chien et al. ................... 382/103 |
| 2008/0130744 | A1 * | 6/2008 | Huang et al. ............. 375/240.08 |
| 2010/0131442 | A1 * | 5/2010 | Sheu et al. ...................... 706/46 |

OTHER PUBLICATIONS

Wei-Kai Chan; Shao-Yi Chien, "Real-Time Memory-Efficient Video Object Segmentation in Dynamic Background with Multi-Background Registration Technique," Multimedia Signal Processing, 2007. MMSP 2007. IEEE 9th Workshop on , vol. No. pp. 219,222, Oct. 1-3, 2007.*
Wei-Kai Chan; Jing-Ying Chang; Tse-Wei Chen; Yu-Hsiang Tseng; Shao-Yi Chien, "Efficient Content Analysis Engine for Visual Surveillance Network," Circuits and Systems for Video Technology, IEEE Transactions on , vol. 19, No. 5, pp. 693,703, May 2009.*

* cited by examiner

*Primary Examiner* — Stephen R Koziol
*Assistant Examiner* — Shaghayegh Azima
(74) *Attorney, Agent, or Firm* — Morris Manning & Martin LLP; Tim Tingkang Xia, Esq.

(57) ABSTRACT

A motion detection method for complex scenes has steps of receiving an image frame including a plurality of pixels, each of the pixel including a first pixel information; performing a multi-background generation module based on the plurality of pixels; generating a plurality of background pixels based on the multi-background generation module; performing a moving object detection module; and deriving the background pixel based on the moving object detection module.

14 Claims, 7 Drawing Sheets

MOTION DETECTION METHOD FOR COMPLEX SCENES

CROSS-REFERENCE TO RELATED APPLICATION

This non-provisional application claims priority under 35 U.S.C. §119(a) on Patent Application No. 100128474 filed in Taiwan R.O.C. on Aug. 10, 2011, the entire contents of which are hereby incorporated by reference.

FIELD OF THE INVENTION

The present invention is a motion detection method for complex scenes. Specifically, the method presents a novel motion detection approach based on radial basis function (RBF) through artificial neural networks to accurately detect moving objects not only in dynamic scenes but also in static scenes.

BACKGROUND OF THE INVENTION

In the past decade, video surveillance systems have been required in order to combat and control the threat of criminals and terrorists in business, law and military. Thus, the video surveillance systems in public spaces have become extremely widespread and accepted by the public. Consequently, the development of the automatic video surveillance systems is highly promoted.

Many functions are involved in automatic video surveillance systems to facilitate a wide range of science and technology applications in computer vision, including transport network, human activity understanding, traffic monitoring and analysis, endangered species conservation, and so on.

There are many important functions that need to be considered in developing automatic video surveillance systems, for example, motion detection, object classification, tracking, identification, behavior recognition, and activity analysis. Motion detection, which is the segmentation of moving objects in video streams, is the first critical process and plays an important role in video surveillance systems.

If the function of the motion detection builds up, the follow-up functions, such as analysis of object movement, video compression, object-computer interaction, will become simple and easy.

Generally, most existing automatic video surveillance methods can have good effects in static scene. However, However, the accuracy of this significant process is usually reduced by the dynamic scenes when the existing process is implemented in the dynamic scenes, such as swaying trees, spouting fountain, rippling water, moving curtains, which are normally encountered in both indoor and outdoor situations. The main reason for the shortcoming is the inherent difficult distinguish between the moving objects and the dynamic background because of the intensity fluctuations of both background and foreground pixels.

In order to settle above-mentioned problems, the present inventors have accomplished to design a motion detection method to accurately detect moving objects not only in dynamic scenes but also in static scenes.

SUMMARY OF THE INVENTION

The objective of the present invention is to provide a motion detection method for complex scenes.

The present invention is a motion detection method for complex scenes.

The method comprises the steps of receiving an image frame including a plurality of pixels, each of the pixel including a first pixel information; performing a multi-background generation module based on the plurality of pixels; generating a plurality of background pixels based on the multi-background generation module; performing a moving object detection module; and deriving the background pixel based on the moving object detection module.

DETAILED DESCRIPTION OF THE PRESENT INVENTION

Figure 1:
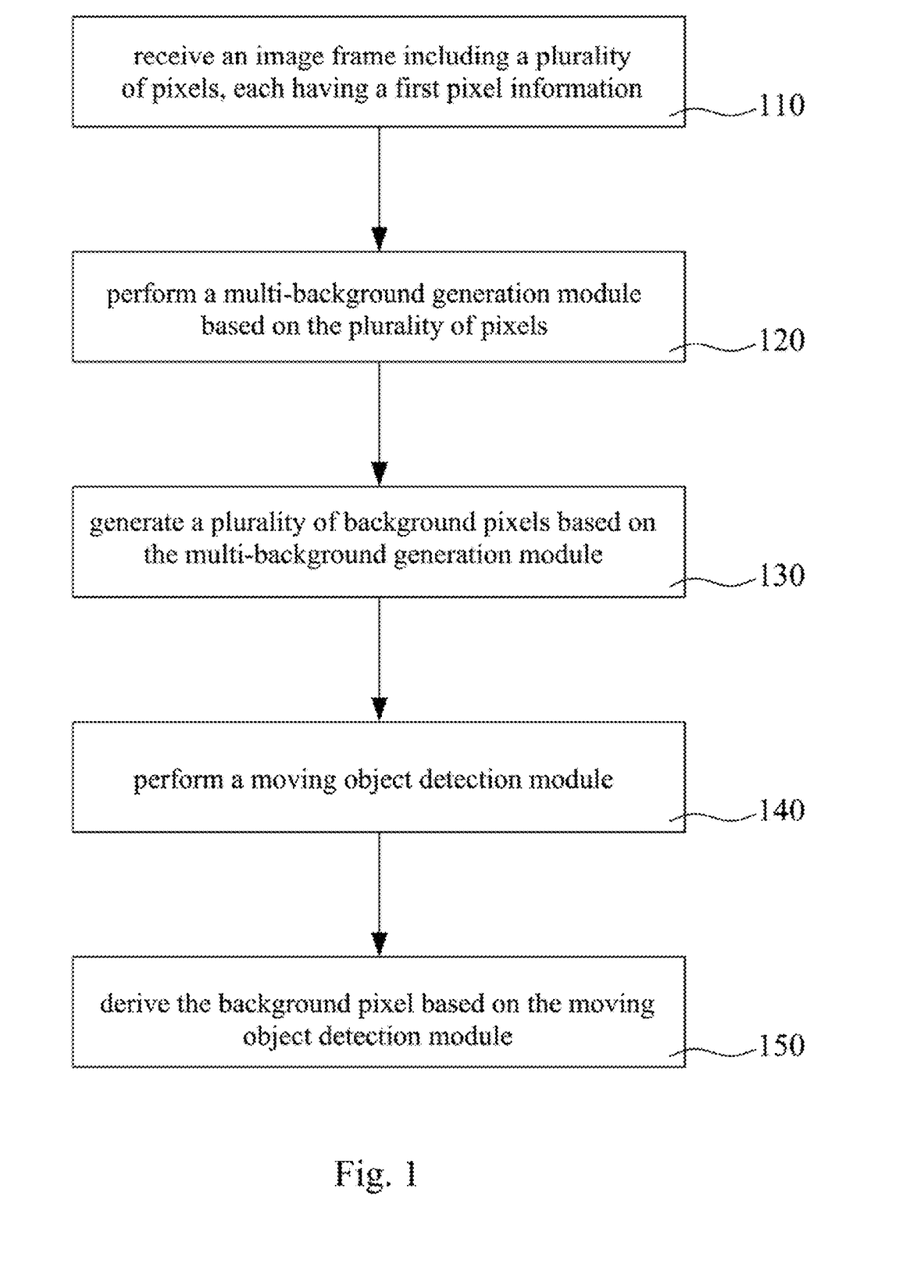
FIG. 1 is a flow chart of a motion detection method for complex scenes in accordance with the present invention.

With reference to FIG. 1, a motion detection method for complex scenes in accordance with the present invention comprises a step (110) of receiving an image frame including a plurality of pixels, each of the pixel including a first pixel information; a step (120) of performing a multi-background generation module based on the plurality of pixels; a step (130) of generating a plurality of background pixels based on the multi-background generation module; a step (140) of performing a moving object detection module; and a step (150) of deriving the background pixel based on the moving object detection module.

In the step (110) of receiving an image frame including a plurality of pixels, each of the pixels including a first pixel information, the first pixel information comprises a hue, a saturation and a value. In this section, three perceptual variables, hue (H), saturation (S), and value (V) are built in HSV color space which is very similar to human visual capability. Let (h, s, v) represent hue, saturation, and value component of a pixel pt(x, y) in each image frame.

Figure 2:
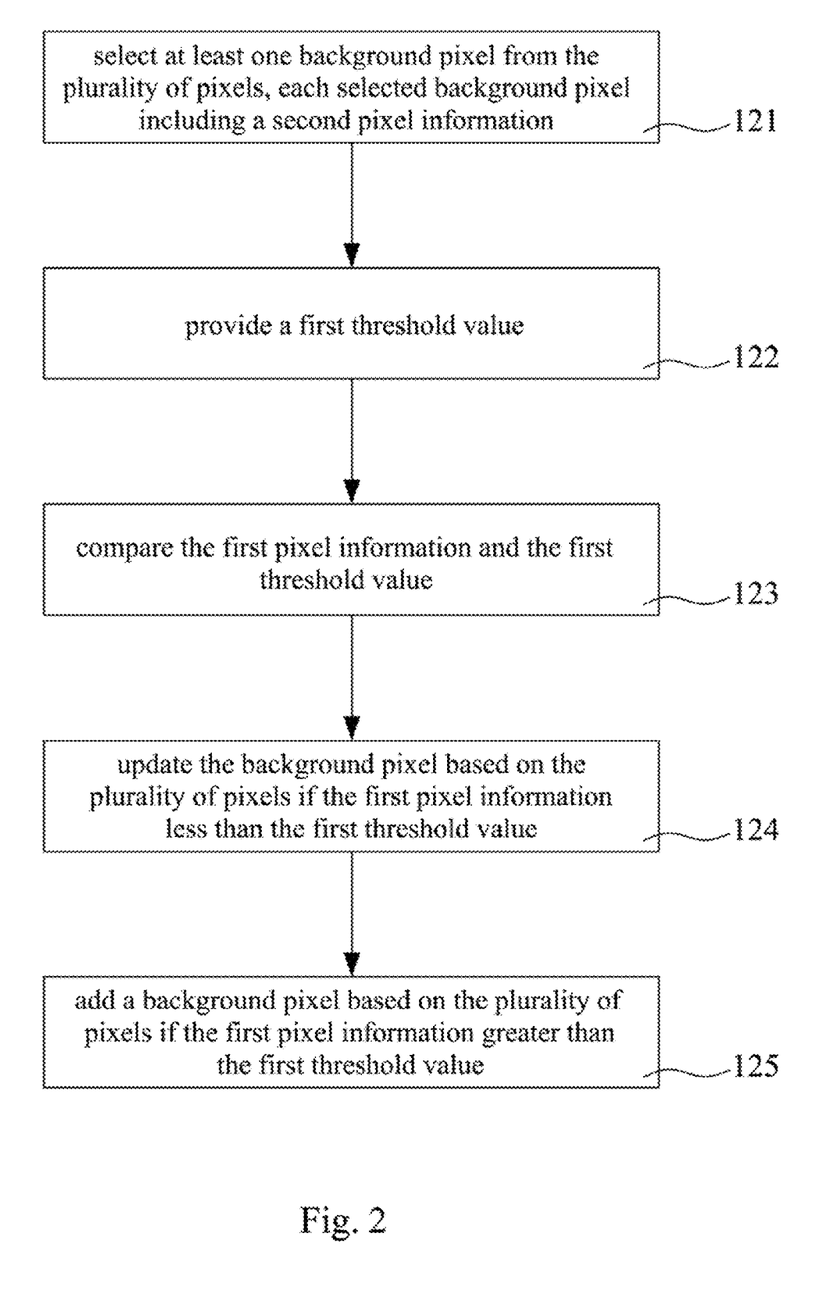
FIG. 2 is a flow chart of a motion detection method for complex scenes in accordance with the present invention.

In the step (120) of performing a multi-background generation module based on the plurality of pixels, with reference to FIG. 2, performing the multi-background generation module comprises a step (121) of selecting at least one background pixel from the plurality of pixels, each of the background pixel including a second pixel information; a step (122) of providing a first threshold value; a step (123) of comparing the first pixel information and the first threshold value; a step (124) of updating the background pixel based on the plurality of pixels if the first pixel information is less than the first threshold value; and a step (125) of adding a background pixel based on the plurality of pixels if the first pixel information is greater than the first threshold value.

In the step (121) of selecting at least one background pixel from the plurality of pixels comprises steps of: calculating a first distance between the first pixel information and the second pixel information; and selecting a background pixel based on the first distance, wherein the first distance is a Euclidean distance, and each of the background pixel includes a second pixel information and the second pixel information comprises a hue, a saturation and a value.

To determine whether or not the incoming pixel pt(x, y) is close to the background pixel, the Euclidean distance of vectors in the HSV color hexcone is used. This is calculated using the first distance from the first pixel information of pixel pi=(hi, si, vi) to the second pixel information of background pixel pj=(hj, sj, vj) by $$d(p_i, p_j) = \|(v_i s_i \cos(h_i), v_i s_i \sin(h_i), v_i) - (v_j s_j \cos(h_j), v_j s_j \sin(h_j), v_j)\|_2^2$$

Use of this equation can circumvent problems in the periodicity of hue and the unsteadiness of hue for small saturation values.

In the step (122) of providing the first threshold value, after selecting at least one background pixel from the plurality of pixels, an empirical tolerance, $\epsilon$ the first threshold value, is used to determine whether or not incoming pixel pt(x, y) belongs to background pixel candidates B(x, y)k, where k=1~n. This decision rule can be expressed as:

$$p_t(x, y) \begin{cases} \in B(x, y)_k; \text{ if } d(p_t(x, y), B(x, y)_k) \le \epsilon \\ \notin B(x, y)_k; \text{ otherwise.} \end{cases}$$

In the step (123) of comparing the first pixel information and the first threshold value, in order to construct a proper flexible multi-background generation model, each incoming pixel intensity value pt(x, y) is compared with the corresponding candidates of the background pixel intensity values B(x, y)1 to B(x, y)n.

In the step (124) of updating the background pixel based on the plurality of pixels if the first pixel information less than the first threshold value, if the intensity of incoming pixel pt(x, y) is close to the related candidates of the background pixel— e.g. if the incoming pixel belongs to the background pixel— the related background pixel is updated.

Background pixels close to the incoming pixel pt(x; y) are updated by $$B(x,y)'_k = (1-\beta)B(x,y)_k + \beta p_t(x,y)$$

where $B(x, y)_k$, $B(x, y)'_k$ are the original and updated kth candidates at position (x, y), and $\beta$ is a predefined parameter.

In the step (125) of adding a background pixel based on the plurality of pixels if the first pixel information is greater than the first threshold value, if not, pt(x, y) is declared as a new background pixel.

Figure 3:
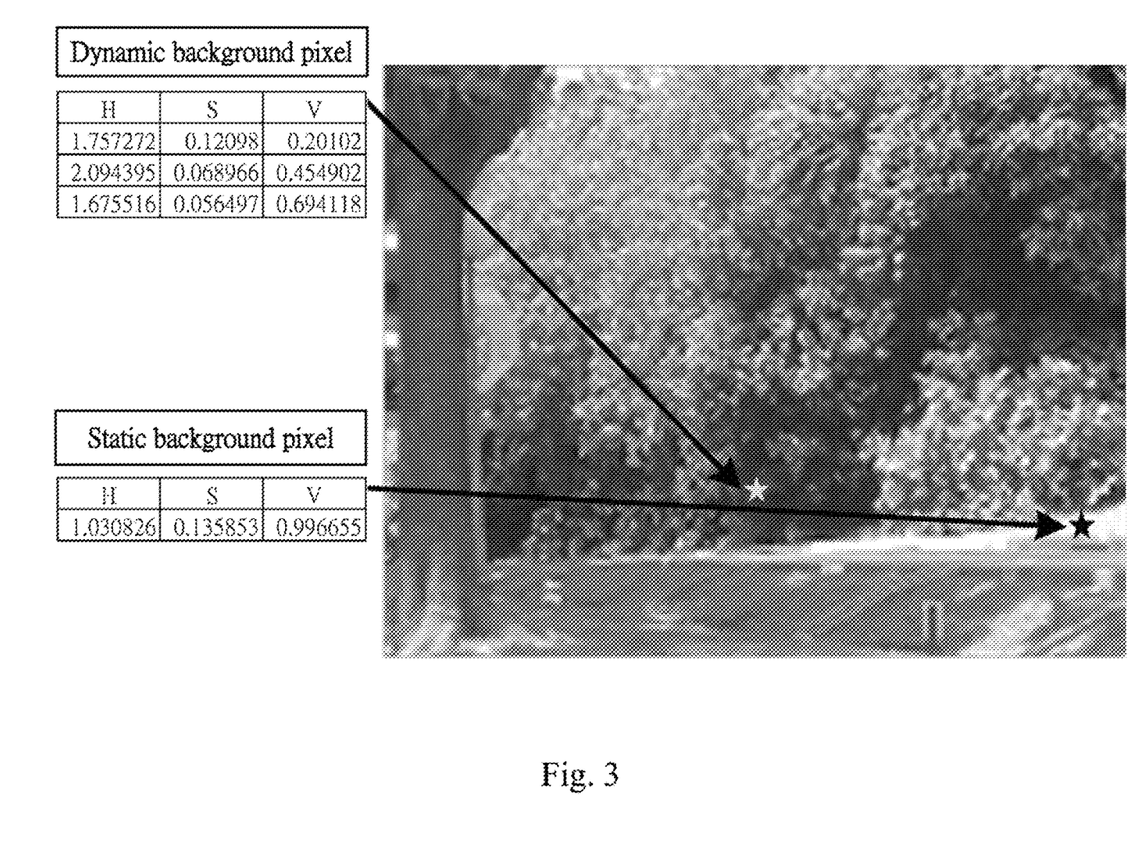
FIG. 3 is a diagram illustrating candidates of background pixel from dynamic and static area.

In the step (130) of generating a plurality of background pixels based on the multi-background generation module, with reference to FIG. 3 which illustrates an observed scene with a dynamic background pixel and a static background pixel, the white point is the dynamic background pixel of which dynamic range can be expressed by three different candidates and the black point is a background pixel which only requires a single candidate.

Figure 4:
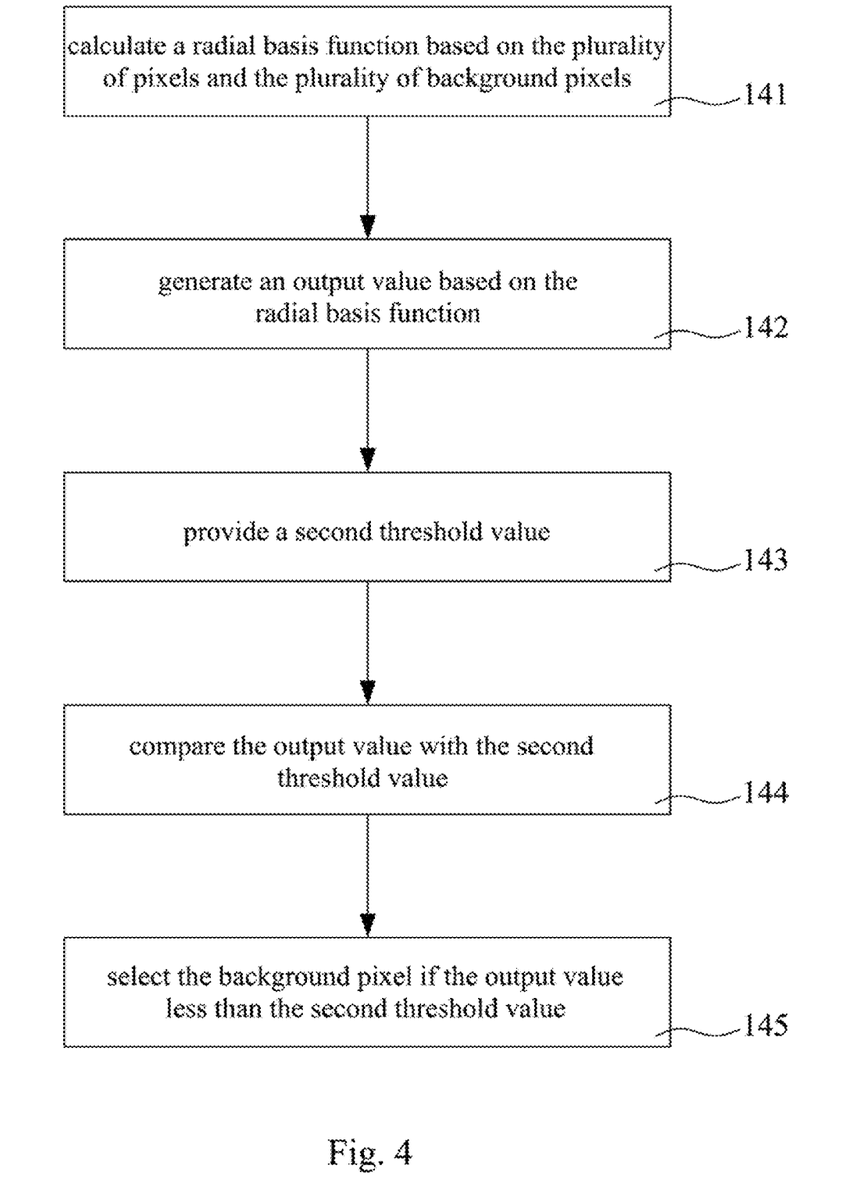
FIG. 4 is a flow chart of a motion detection method for complex scenes in accordance with the present invention.

In the step (140) of performing a moving object detection module, with reference to FIG. 4, the moving object detection module comprises a step (141) of calculating a radial base function based on the plurality of pixels and the plurality of background pixels; a step (142) of generating an output value based on the radial basis function; a step (143) of providing a second threshold value; a step (144) of comparing the output value with the second threshold value; and a step (145) of selecting the background pixel if the output value is less than the second threshold value.

Figure 5:
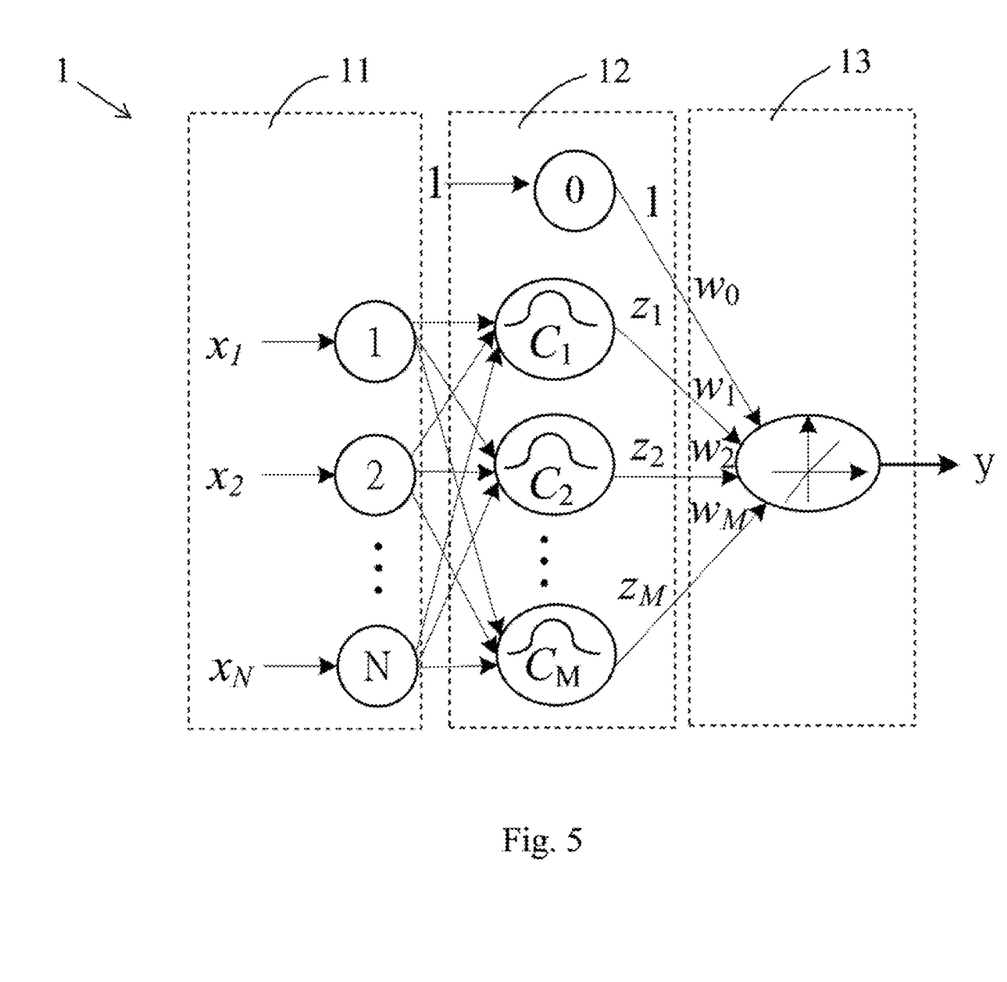
FIG. 5 is a diagram illustrating the radial basis function (RBF) through artificial neural networks in accordance with the present invention.

In the step (141) of calculating a radial base function based on the plurality of pixels and the plurality of background pixels, with reference to FIG. 5, the present invention proposes a novel motion detection approach based on the radial basis function (RBF) through artificial neural networks. This process extracts moving objects from dynamic scenes and static backgrounds in order to effectively avoid misjudging dynamic backgrounds as moving objects.

The RBF neural network consists of an input layer (11) which has three neurons, a hidden layer (12) which has M neurons, and an output layer (13) which has a neuron, it has certain advantages which include simple network configurations, fast learning speed by locally tuned neurons, and good approximation properties.

A sufficient number of hidden layer neurons can improve the accuracy. Nevertheless, too many neurons may result in enlargement of the network structure and reduction in performance quality. Therefore, it is very important to construct a proper flexible multi-background generation module which can represent the hidden layer neurons.

In the step (142) of generating a output value based on the radial base function comprises steps of inputting the first pixel information; calculating a second distance between the first pixel information and the second pixel information; providing a base function; and calculating the output value based on the second distance. The second distance is a Euclidean distance, the base function may be a Gaussian function, Linear function, Cubic function or a Plate spline function.

The multi-background generation module determines the number M and center points C1~CM of the hidden layer neurons in the RBF network. It also determines the structure of the network. After the structure is determined, the HSV components (h, s, v) of the incoming pixel pt(x, y) are used as the input vector, also called the first pixel information. The input layer neurons propagate the input vector to the hidden layer neurons. After Euclidean distance between the input vector and the second pixel information of the background pixel of center points of the hidden layer neurons is calculated, the output value of each hidden layer neuron is generated by the base function as follows:

$$z_i(p) = \phi(\|p - C_i\|) i = 1, 2, \ldots, M$$

$\phi(.)$ is the base function, Ci is the center point of the ith neuron, p is the input vector, M is the number of hidden layer neurons, and $\|p - C_i\|$ is the Euclidean distance between p and Ci.

Generally speaking, several types of base functions are commonly used such as the Gaussian function, Linear function, Cubic function, Plate spline function and etc. For present invention, the most common base function, the Gaussian function is used. The function is as follows:

$$\phi(\|p - C_i\|) = \exp\left(\frac{-\|p - C_i\|^2}{2\sigma^2}\right)$$

where $\sigma$ is defined as $\epsilon$, where $\epsilon$ is the first threshold value.

The step (143) of providing a second threshold value comprises providing the second threshold value based on the output value.

The step of selecting the background pixel if the output value is less than the second threshold value, comprises steps of splitting the image frame into a plurality of blocks, each of the block including the plurality of background pixels; calculating a total output value based on the output value; and selecting the block if the total output value is less than the second threshold value.

Because the Gaussian function is factorizable and localized, it is suitable for the current application. Moreover, the Gaussian function can be used to provide a fine fit for checking the block state empirically. The larger the output value of base function is, the closer the input vector is located to the center points—e.g. the higher the probability of the incoming pixel being background pixel. In order to eliminate unnecessary examination of the dynamic and static background regions, the incoming frame is split into w×w blocks. The calculation of the sum of base functions within each block is as follows:

$$\delta = \sum_{p \in \mu} \sum_{i=1}^{M} \phi(\|p - C_i\|)$$

where p is every independent pixel of the corresponding block μ, M is the number of hidden neurons, and w can be set to be 4.

When the calculated sum of block (i, j) exceeds the second threshold value S, the block A(i, j) is labeled as '0', which indicates that it does not contain pixels belonging to moving objects. Otherwise, block A(i, j) is labeled as '1', meaning that it is highly probable that it contains pixels of moving objects.

$$A(i, j) = \begin{cases} 0, \text{ if } \delta \geq S \\ 1, \text{ otherwise} \end{cases}$$

Figure 6:
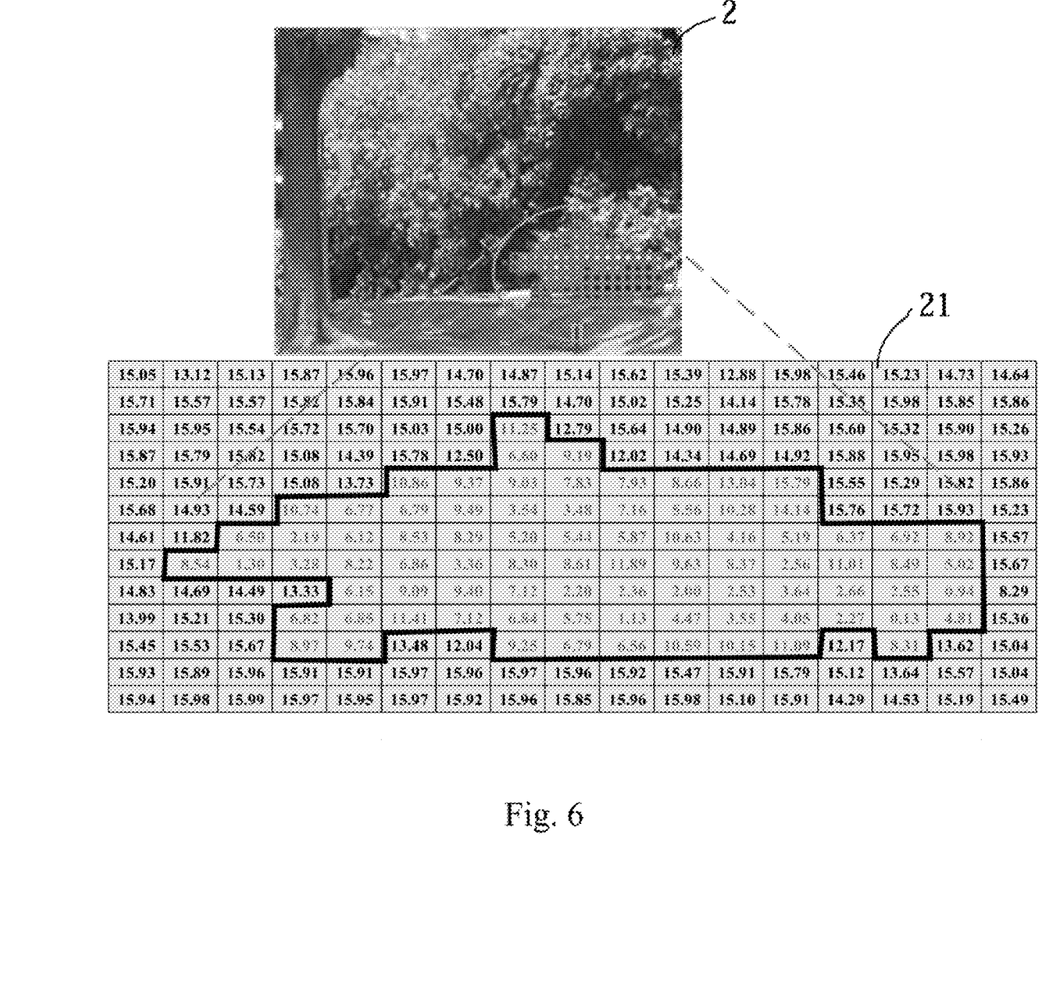
FIG. 6 is a diagram illustrating the sum of base functions within blocks in a sampled video frame in accordance with the present invention.

With reference to FIG. 6, illustrating the sum of base functions within blocks in a sampled video frame, the image frame (2) comprises a plurality of blocks (21). By setting the second threshold value (S) to be equal to 12, possible motion blocks (21) containing moving objects can then be detected. Finally, the background pixel candidates are updated in the hidden layer by:

$$B(x, y)_k^t = \begin{cases} B(x; y)_k^{t-1}, \text{ if } p_t(x; y) \notin B(x; y)_k^{t-1} \\ \alpha p_t(x; y) + (1 - \alpha)B(x; y)_k^{t-1}; \text{ otherwise} \end{cases}$$

where $B(x,y)_k^{t-1}$, $B(x,y)_k^t$ are the kth candidates at position (x, y) of the previous and current flexible multi-background generation modules, and α is a predefined parameter. The decision rule of whether pt(x, y) belongs to $B(x,y)_k^{t-1}$ is determined according to step (122).

Finally, in step (150) of deriving the background pixel based on the moving object detection module, after the block alarm procedure, unnecessary examinations are eliminated and the object extraction procedure processes only blocks containing moving objects. As the last step of current approach, the output layer of the RBF network is used to compute the binary motion detection mask as the detection result. The output layer computes a function of the weighted linear combination of the values emerging from the hidden layer as follows:

$$F = \sum_{i=1}^{M} w_i(z_i(p)) + w_0$$

where $w_i$ is the weight that connects the ith hidden layer neuron and the output layer, $z_i$ is the output value of ith hidden layer neuron, and w0 is a fixed threshold. Initially, $w_i$ is experimentally set to 1. The binary motion detection mask is obtained as follows:

$$D(x, y) = \begin{cases} 1, \text{ if } F(x, y) < 0 \\ 0, \text{ otherwise} \end{cases}$$

To label D(x, y) with '1', means that pixel pt(x, y) is a part of a moving object; otherwise, pt(x, y) is a part of the background pixel and is labeled as '0'. After finishing operations for the current incoming frame, the weights are adjusted for operations for the next incoming frame. In the beginning, all weights are initialized to 1, after which the weights are adjusted as follows:

$$w_i^{t+1} = (w_i^t + \eta \cdot z_i) \cdot \frac{M}{M + \eta \cdot \sum_{i=1}^{M} z_i}$$

where $w_i^t$ is the weight among the output layer and ith hidden layer neuron at frame $I_t$, η is the learning rate, and M is the number of hidden layer neurons. After weight adjusting, the weights among the output layer and the hidden layer neurons which are close to the input vector are reinforced, and the others are decreased.

Figure 7:
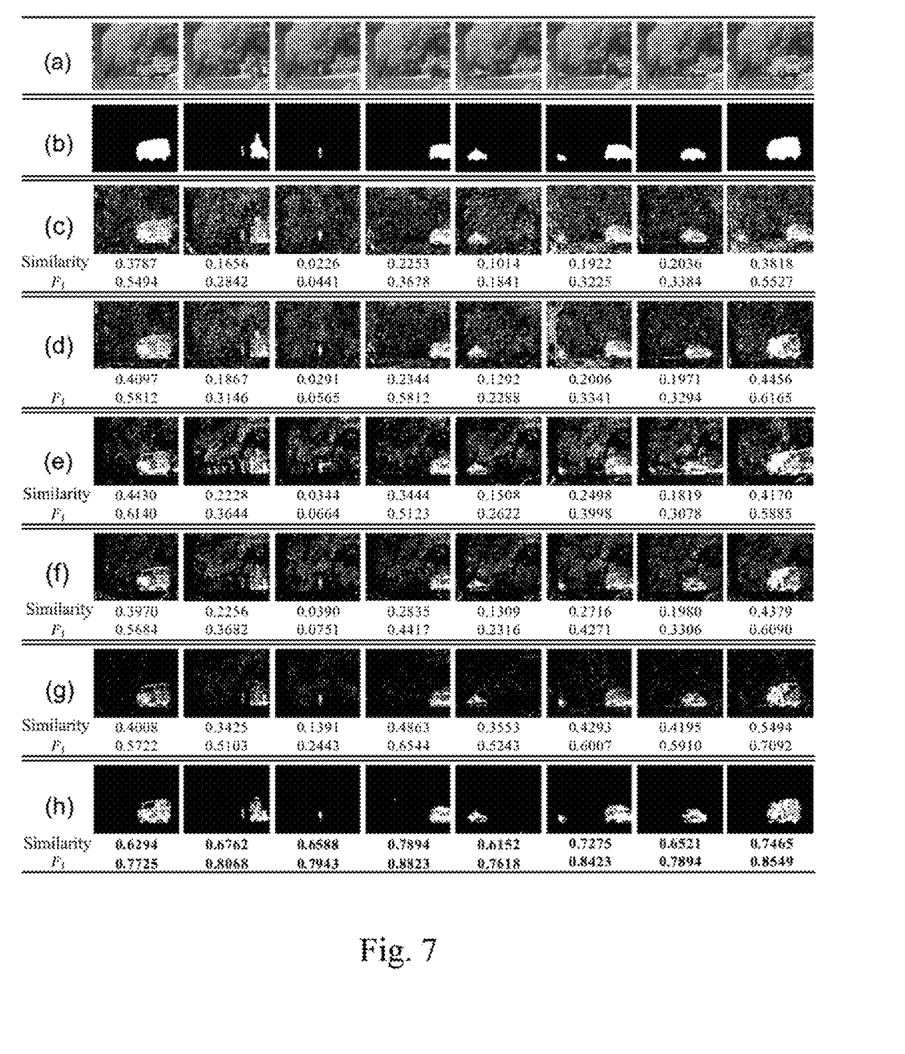
FIG. 7 is a diagram illustrating detected results of contrast according to the present invention, as compared with the related art.

With reference to FIG. 7, it is noted that the figure illustrates detect results of contrast according to the preferred embodiment of the present invention, as compared with the related art.

Figures in order: (a) incoming image frame; (b) ground truths; (c)prior art 1; (d) prior art 2; (e) prior art 3; (f) prior art 4; (g) prior art 5; and (h) the present invention.

The overall results show that the proposed method substantially outperforms existing methods by Similarity and F1 accuracy rates of 82.93% and 87.25%, respectively.

In contrast to the previously mentioned methods, the present invention presents a novel motion detection approach based on the radial basis function (RBF) through artificial neural networks in order to segment moving objects in dynamic scenes.

The method can effectively adapt to environmental changes and achieve accurate and complete detection in both dynamic and static scenes. Basically, the RBF neural network possesses the strong nonlinear mapping ability and the local synaptic plasticity of neurons with minimal network structure. This allows it to be suitable for motion detection application in either dynamic or static scenes. The following illustrates the organization of the proposed method.

1) A flexible multi-background model is effectively generated by an unsupervised learning process in order to fulfill the properties of either dynamic background or static background.

2) Each incoming pixel is mapped to the flexible multi-background model by locally tuned neurons of the RBF neural network; this achieves the accurate segmentation of moving objects through a block-based and a pixel based detection procedure.

3) The output weights are then updated to accommodate the environmental changes for operations concerning the next incoming frame. The method provides a more accurate and complete detection for both static and dynamic scenes when compared with other state-of-the-art methods. The experimental results are evaluated by qualitative and quantitative comparisons based on a wide range of natural video sequences.

What is claimed is:

1. A motion detection method for complex scenes, the method comprising the steps of:
  receiving an image frame including a plurality of pixels each having a first pixel information;
  performing a multi-background generation module based on the plurality of pixels comprising:
    selecting at least one background pixel from the plurality of pixels, each selected background pixel including a second pixel information;
    providing a first threshold value;
    comparing the first pixel information and the first threshold value;
    updating the background pixel based on the plurality of pixels if the first pixel information is less than the first threshold value; and
    adding a background pixel based on the plurality of pixels if the first pixel information is greater than the first threshold value;
  generating a plurality of background pixels based on the multi-background generation module;
  performing a moving object detection module comprising:
    calculating a radial basis function based on the plurality of pixels and the plurality of background pixels;
    generating an output value based on the radial basis function;
    providing a second threshold value;
    comparing the output value with the second threshold value; and
    selecting the background pixel if the output value is less than the second threshold value; and
  deriving the background pixel based on the moving object detection module.

2. The method as claimed in claim 1, wherein the first pixel information comprises:
  a hue;
  a saturation; and
  a value.

3. The method as claimed in claim 2, wherein the second pixel information comprises:
  a hue;
  a saturation; and
  a value.

4. The method as claimed in claim 1, wherein the step of selecting at least one background pixel from the plurality of pixels comprises steps of:
  calculating a first distance between the first pixel information and the second pixel information; and
  selecting the background pixel based on the first distance.

5. The method as claimed in claim 4, wherein the first distance is a Euclidean distance.

6. The method as claimed in claim 1, wherein the step of generating the output value based on the radial basis function comprises steps of:
  inputting the first pixel information;
  calculating a second distance between the first pixel information and the second pixel information;
  providing a base function; and
  calculating the output value based on the second distance.

7. The method as claimed in claim 6, wherein the second distance is a Euclidean distance.

8. The method as claimed in claim 6, wherein the base function is a gaussian function.

9. The method as claimed in claim 6, wherein the base function is a linear function.

10. The method as claimed in claim 6, wherein the base function is a cubic function.

11. The method as claimed in claim 6, wherein the base function is a plate spline function.

12. The method as claimed in claim 1, wherein the step of providing the second threshold value comprises:
  providing the second threshold value based on the output value.

13. The method as claimed in claim 1, wherein the step of selecting the background pixel if the output value is less than the second threshold value, comprises steps of:
  splitting the image frame into a plurality of blocks, each block including the plurality of pixels; and
  selecting the block if the output value is less than the second threshold value.

14. The method as claimed in claim 13, wherein the step of selecting the block if the output value is less than the second threshold value, comprises steps of:
  calculating a total output value based on the output value; and
  selecting the block if the total output value is less than the second threshold value.

* * * * *